April 14, 1936.   E. G. BODEN   2,037,206
SHAFT BEARING
Filed Jan. 2, 1934
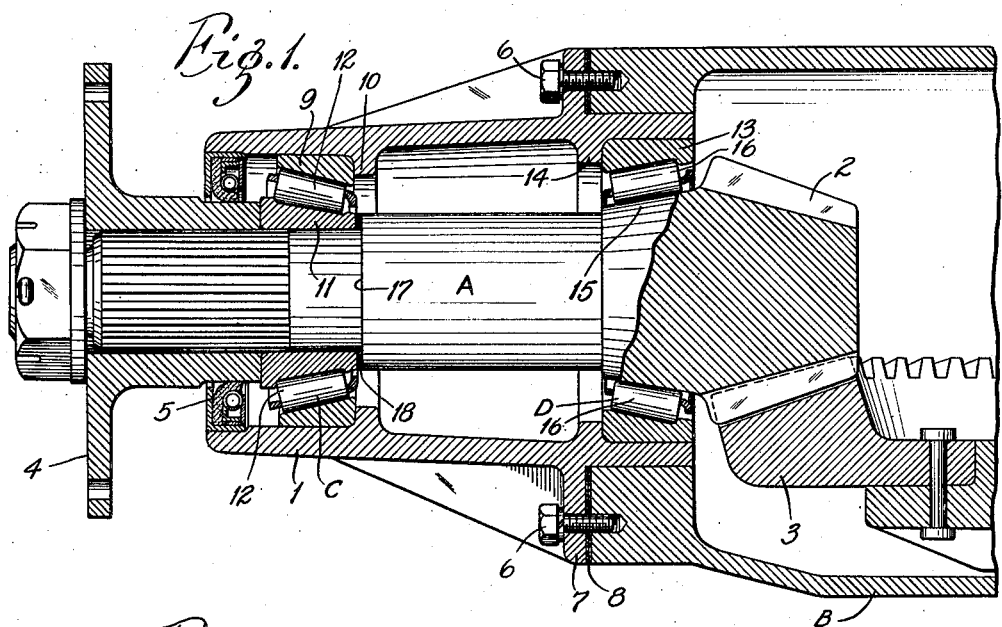
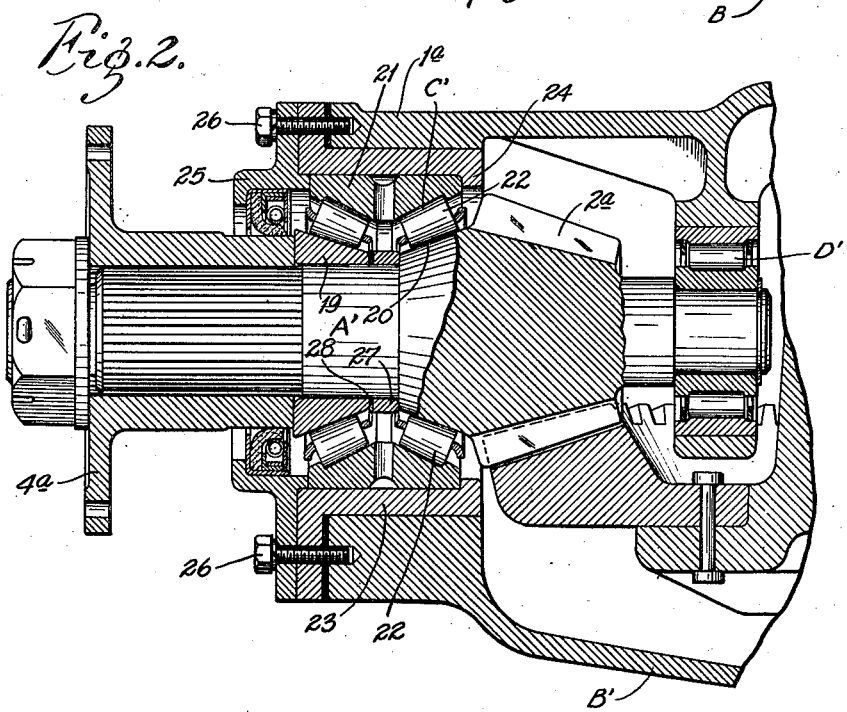
INVENTOR:
Ernst G. Boden
HIS ATTORNEYS Patented Apr. 14, 1936

2,037,206

UNITED STATES PATENT OFFICE 2,037,206

SHAFT BEARING

Ernest G. Boden, Canton, Ohio, assignor to The Timken Roller Bearing Company, Canton, Ohio, a corporation of Ohio Application January 2, 1934, Serial No. 704,823

5 Claims. (Cl. 74—424)

This invention relates to shaft bearings, particularly pinion shaft bearings of automotive driving axles. The principal objects of the present invention are to provide for the use of smaller and cheaper bearings in such pinion shaft mountings and to increase the strength and rigidity of the pinion shaft. The invention consists in forming the surface of the pinion shaft as a bearing surface for the rollers of the pinion back-up bearing; and it also consists in the parts and combinations and arrangements of parts hereinafter described and claimed.

In the accompanying drawing, which forms part of this specification and wherein like symbols refer to like parts wherever they occur:

Fig. 1 is a fragmentary longitudinal sectional view of an automotive driving axle provided with a pinion shaft mounting embodying my invention; and Fig. 2 is a similar view illustrating a modified form of the invention.

In Fig. 1 of the drawing, my invention is shown in connection with an automotive driving axle construction comprising a drive shaft A mounted in a nosing 1, which forms a separable part of an axle housing or differential carrier B of a well known type. The drive or pinion shaft A is provided at its inner end with a bevel pinion 2 which is integral therewith and intermeshes with the bevel ring gear 3 of the usual differential mechanism (not shown). The outer end of the pinion shaft is provided with the usual driving disk 4, whose hub portion extends into the outer end of the nosing 1; and the annular space between said hub and said nosing is closed by a suitable annular oil seal 5. The nosing 1 fits within a circular opening in the housing B and is secured to said housing by a circular series of cap screws 6 that pass through an outstanding annular flange 7 on said nosing and are threaded into said housing. The nosing is adjusted longitudinally to obtain the desired depth of enmeshment of the pinion 2 and the gear 3 preferably by means of shims 8 interposed between the housing B and the annular flange 7 of said nosing.

The pinion shaft A is rotatably supported in the nosing 1 of the axle housing B by means of two longitudinally spaced taper roller bearings C and D, respectively. The outermost bearing C comprises a cup or outer raceway member 9 seated in the nosing with its large or inner end abutting against an annular shoulder 10 therein, a cone or inner raceway member 11 mounted on said pinion shaft with its large or outer end abutting against the hub of the driving disk 4, and a series of conical bearing rollers 12 interposed between said cup and said cone. The innermost bearing D is located adjacent to the pinion 2 at the inner end of the pinion shaft A and comprises a cup or outer raceway member 13 mounted in the nosing 1 with its large end abutting against an annular shoulder 14 therein; an enlarged conical portion 15 formed integral with said pinion shaft and constituting the inner raceway of said bearing, and a series of conical bearing rollers 16 interposed between said outer and inner raceways. The cone 11 of the outermost bearing C is prevented from sliding inwardly on the pinion shaft 1 by means of a shoulder 17 formed on said shaft by a reduction in the diameter of the cone receiving portion thereof, suitable adjusting shims 18 being interposed between said shoulder and the adjacent end of said cone.

By the arrangement described, the enlarged portion 15 of the pinion shaft 1 serves to back up the pinion 2 at the inner end thereof and to greatly strengthen said shaft at the point where bending is liable to occur. The enlarged conical portion of the pinion shaft also constitutes the inner raceway of the pinion back-up bearing D and thus dispenses with the use of a separate inner raceway member, which necessitates a reduction in the diameter of the pinion shaft to accommodate the raceway member and a consequent weakening of said shaft. The construction also permits the use of a smaller pinion back-up bearing; and it also tends to prevent whipping or vibration of the pinion shaft.

In the modification illustrated in Fig. 2, the supporting bearings for the pinion shaft A′ comprises a double taper roller bearing C′ located at one end of the pinion 2ª and a cylindrical roller bearing D′ located at the opposite end of said pinion. The double taper roller bearing C′ comprises a cone or inner raceway member 19 mounted on the pinion shaft, a cone or inner raceway 20 formed integral with said shaft at the large end of the pinion thereon, a doubly coned cup or outer bearing member 21 supported in the nosing 1ª of the axle housing B′ and conical bearing rollers 22 interposed between the conical raceways of said cup and the respective cones. The doubly coned cup 21 is mounted in a sleeve or carrier 23 between an annular shoulder 24 at the inner end thereof and a closure member 25 at the outer end thereof. The carrier 23 fits within the nosing 1ª; and said carrier and said closure member are secured to the outer end of said nosing by means of cap screws 26, suitable adjusting shims being interposed between the carrier and the nosing. The cone member 19 abuts against the hub of the driving disk 4ᵃ; and a suitable spacing sleeve 27 is interposed between said cone and a shoulder formed by the enlarged conical raceway portion 20 of the pinion shaft, with adjusting shims 28 interposed between said spacing ring and said cone.

Obviously, the hereinbefore described constructions admit of considerable variation without departing from the spirit of my invention. Therefore, I do not wish to be limited to the precise constructions shown and described.

What I claim is:

1. A housing, a shaft therein having a bevel gear formed integral therewith, and a taper roller bearing interposed between said housing and said shaft, said taper roller bearing comprising an outer raceway member in said housing having an internal rib, bearing rollers cooperating with said outer raceway member and abutting against said rib, and an enlarged conical portion formed integral with said shaft with the large end of said portion disposed adjacent to the large end of the bevel gear thereon, said enlarged conical portion of said shaft being free from shoulders and constituting a conical inner raceway for said rollers, the diameter of the large end of said enlarged conical portion of said shaft corresponding substantially to the root diameter of said bevel gear at the large end thereof.

2. In an automotive driving axle, a housing, a pinion shaft therein having a bevel pinion formed integral therewith, and a taper roller bearing interposed between said housing and said pinion shaft, said taper roller bearing comprising a conical outer raceway member seated in said housing, conical bearing rollers cooperating with said conical outer raceway member, and an enlarged conical portion formed integral with said pinion shaft and constituting a conical inner raceway for said conical bearing rollers, said enlarged conical portion of said pinion shaft being disposed with its large end adjacent to the large end of said bevel pinion and terminating at the root diameter thereof.

3. In an automotive driving axle, a housing, a pinion shaft therein having a bevel pinion formed integral therewith, and a taper roller bearing interposed between said housing and said pinion shaft, said taper roller bearing comprising a conical outer raceway member seated in said housing, conical bearing rollers cooperating with said conical outer raceway member, and an enlarged conical portion formed integral with said pinion shaft and constituting a conical inner raceway for said conical bearing rollers, said enlarged conical portion of said pinion shaft being disposed with its large end adjacent to the large end of said bevel pinion and terminating at the root diameter thereof, the angle formed by the large ends of the teeth of said bevel pinion and said conical inner raceway being radiused.

4. A shaft having a bevel gear formed integral therewith and an enlarged conical portion formed integral with said shaft at the large end of the bevel pinion and constituting a conical inner raceway for a roller bearing, said enlarged conical portion being disposed with its large end adjacent to the large end of said bevel gear and the diameter of said large end of said enlarged conical portion corresponding substantially to the root diameter of said pinion at the large end thereof.

5. A shaft having a bevel gear formed integral therewith and an enlarged conical portion formed integral with said shaft at the large end of the bevel pinion and constituting a conical inner raceway for a roller bearing, said enlarged conical portion being disposed with its large end adjacent to the large end of said bevel gear and the diameter of said large end of said enlarged conical portion corresponding substantially to the root diameter of said pinion at the large end thereof, the angle formed by the large ends of the teeth of said bevel pinion and said conical inner raceway being radiused.

ERNEST G. BODEN.